United States Patent
Raetzsch et al.

(10) Patent No.: US 6,433,109 B1
(45) Date of Patent: Aug. 13, 2002

(54) MODIFIED POLYPROPYLENES OF IMPROVED PROCESSABILITY

(75) Inventors: Manfred Raetzsch, Kirchschlag; Hartmut Bucka, Eggendorf; Achim Hesse, Linz; Ulf Panzer, Perg; Norbert Reichelt, Neuhofen, all of (AT)

(73) Assignee: Borealis GmbH, Schwechat-Mannsworth (AT)

( * ) Notice: Subject to any disclaimer, the term of this patent is extended or adjusted under 35 U.S.C. 154(b) by 0 days.

(21) Appl. No.: 09/714,677

(22) Filed: Nov. 16, 2000

Related U.S. Application Data

(62) Division of application No. 09/074,324, filed on May 7, 1998, now Pat. No. 6,204,348.

(30) Foreign Application Priority Data

May 20, 1997 (DE) .......................................... 197 20 973
Jun. 10, 1997 (DE) .......................................... 197 24 414

(51) Int. Cl.[7] .......................... C08F 2/00; C08F 110/06; C08F 210/06
(52) U.S. Cl. ...................... 526/73; 526/351; 526/348.6; 526/901; 526/335; 526/336; 526/339; 529/572
(58) Field of Search ............................... 526/351, 348.6, 526/901, 335, 336, 339, 73; 524/572

(56) References Cited

U.S. PATENT DOCUMENTS

| | | | | |
|---|---|---|---|---|
| 5,411,994 A | * | 5/1995 | Galli et al. ................. | 521/50.5 |
| 5,744,068 A | * | 4/1998 | Bailly et al. ................ | 525/391 |
| 5,869,591 A | * | 2/1999 | McKay et al. .............. | 526/347 |
| 5,929,127 A | * | 7/1999 | Raetzsch et al. ............ | 521/81 |

* cited by examiner

Primary Examiner—David W. Wu
Assistant Examiner—R. Harlan
(74) Attorney, Agent, or Firm—Jordan and Hamburg LLP

(57) ABSTRACT

Modified polypropylenes of improved processability are produced by a continuous method by absorptively charging polypropylene particles at 20° to 120° C. with a gas mixture, which contains oxygen and bifunctional, unsaturated monomers, and melting the mixture.

Figure 1:
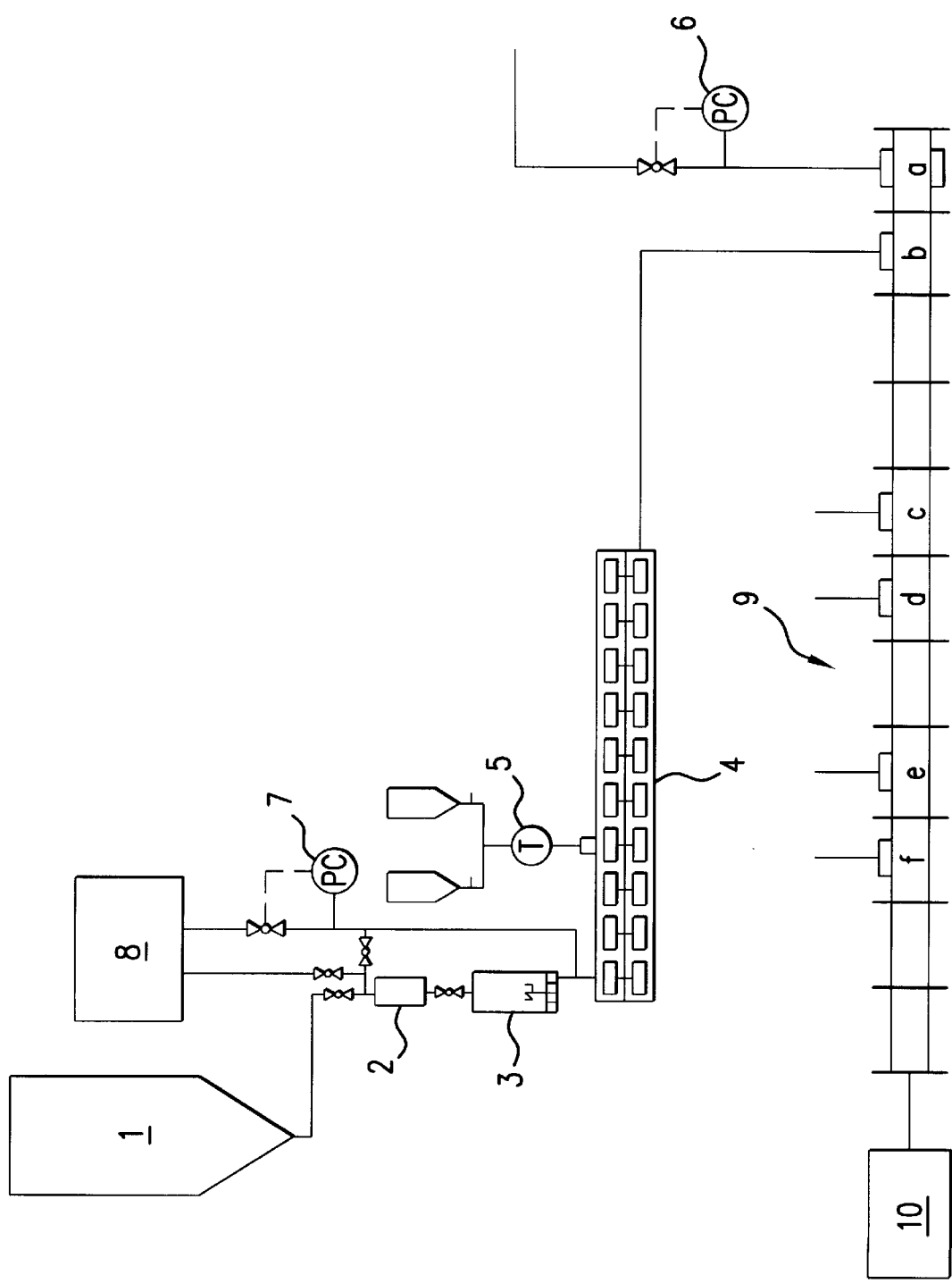

The modified polypropylenes of improved processability as well as mixtures with unmodified polypropylenes are suitable for the production of films, sheets, fibers, panels, coatings, pipes, hollow objects and foamed materials.

14 Claims, 1 Drawing Sheet

MODIFIED POLYPROPYLENES OF IMPROVED PROCESSABILITY

This application is a divisional of U.S. application Ser. No. 09/074,324, filed May 7, 1998, now U.S. Pat. No. 6,204,348.

The invention relates to modified polypropylenes of improved processability, which are produced by the reaction of polypropylene with unsaturated monomers.

In contrast to polyethylenes of low density, which have been produced by high-pressure processes, polypropylenes exhibit a series of disadvantages during thermoplastic processing, such as an increased instability of the melt and the therewith associated smaller processing window. Compared to polyethylene, unmodified polypropylenes permit only a much lower processing speed.

Known methods for improving the processability of polypropylene are the use of blends of polypropylene with LDPE (German patent 32 20 269, WO 94/13460, WO 93/15132), of blends of polypropylene and mixtures of LDPE and hydrogenated vinyltoluene-methylstyrene copolymers (U.S. Pat. No. 4,365,044), of blends of polypropylene and partially cross linked polybutadienes (German patent 29 37 528), ethylene-propylene rubber (EP 505 850), polymethacrylates (European patent 570 221, U.S. Pat. No. 5,506,307), acrylate-grafted polypropylenes (Cruz, Calif., Proc. Polyolefins VIII Intern. Conference Houston, 523, page 147) or EVA (U.S. Pat. No. 4,352,892, British patent 1,400,494).

It is a disadvantage of these methods that the advantageous material properties of polypropylenes, such as non-deformability at elevated temperatures, transparency and modulus, are adversely affected by the high proportion of the modifying components.

An improvement in the processability of polypropylene is also brought about by the treatment of the powder in the solid phase with ionizing radiation (European patent 190 899), peroxides (European patent 384 431) or monomer/peroxide mixtures (EP 437 808). A treatment of polypropylenepoly-ethylene melts with peroxides for improving the processability (Xanthos, M., Adv. Polym. Techn. 11(1992)4, 295–304) is also known.

Numerous developments of the solid phase modification of polyolefins, including polypropylene, have become known recently. Solid phase grafting is understood to be the coupling of an unsaturated monomeric compound to a free radical site on the polymer molecule, which was produced by a free radical transfer or by high-energy radiation and is present in the solid phase at temperatures below the melting point or the softening point of the polyolefin. For this process, the polyolefins are present in particle form, for example as a powder or granulate, or as a film, sheet or fiber. Compared to the melt modification, the advantage of this method lies, above all, in the lower reaction temperature and therewith drastically reduced degradation and, compared to the solvent modification, the advantage lies in the fact that no organic solvent is used and that such a solvent does not have to be removed after the modification step.

In comparison to the melt modification or solvent modification, it is a disadvantage of the solid phase modification, above all, that the reactions between polymer molecules, as required for the formation of modified polymer structures, proceed very slowly or are strongly hindered in the solid phase.

A series of known solid phase modification methods is characterized by the addition of liquid, unsaturated, monomeric compounds. For example, the German patent 41 23 972 discloses a discontinuous method for producing polar-modified polyethylenes by the free radical coupling of carboxyl monomers and carboxyl monomer mixtures, 50 to 80 parts by weight of carboxyl monomer or carboxyl monomer mixture being added to the polyethylene, in which the free radical-forming agent or a mixture of such agents is then dispersed, after which the polymerization is carried out at temperatures ranging from 60° to 100° C.

In the DD 135 622, a method for coupling styrene to polyolefinic substrates, such as polyethylene, ethylene-propylene diene terpolymers, ethylene-vinyl acetate copolymers, polypropylene and chlorinated polyethylene is described, the reaction with styrene or styrene-monomer mixtures taking place below the saturation vapor pressure of the monomers with the dry polymer substrate or with the polymer substrate in the presence of water or a different inert liquid medium. DD 135 621 describes under the same conditions the coupling of butadiene and butadiene-containing monomer mixtures and DD 131 752 describes the coupling of vinyl acetate and vinyl acetate-containing monomer mixtures with the same: polymer substrates. Likewise, the addition of swelling agents to increase the yields of the modification reaction of polyolefin particles in the solid phase is known (European patent 0 376 753).

Usually, when liquid, unsaturated monomers are added, they concentrate at the particle surfaces and between the particles. If the free radical-forming agents are decomposed when the monomer distribution is so inhomogeneous, then there is increased homopolymerization of the monomer at the expense of the coupling reaction, that is, there is a reduction in the efficiency of the modification. Moreover, the materials, so produced, have production inhomogeneities and therefore inferior use properties.

One possibility for reducing these disadvantages is indicated in the European patent 0 439 079. A method for producing modified polyolefin copolymers is described, for which the free radical-forming agents and the monomers are added as a liquid phase, either as a pure liquid or as a liquid solution, to the polyolefin particles, the rate of addition of monomer being low and not exceeding 4.5 pph/min. The monomers are added either directly after the whole amount of free radical-forming agent has been added to the polyolefin particles, which are at the temperature required for the decomposition of the initiator, or simultaneously with the addition of the free radical-forming agent, or as a combination of these two methods, in which the addition of free radical-forming agent and of monomer overlaps. However, the significant disadvantages of an inhomogeneous distribution of monomers and of modified regions, which have already been described, also occur with this method.

In the European patent 0 190 889, the solid phase modification of polypropylene for producing branched polypropylene using ionizing radiation is described. One of the disadvantages of this method consists therein that, for deactivating the free radicals in the solid phase, an additional reaction time of 10 minutes to 110 minutes (depending on the temperature), is required.

It is an object of the present invention to develop modified polypropylenes, which have improved processing properties while retaining the strength properties of polypropylene and have been produced by a method, which avoids the disadvantages that have been listed for the known method.

The objects of the present invention accordingly are modified propylene homopolymers and/or modified propylene copolymers of improved processability from propylene homopolymers with melt indexes of 0.05 to 35 g/10 min at 230° C. 2.16 kg and/or copolymers of 85.0 to 99.9% by weight of propylene and 0.1 to 15.0% by weight of α-olefins with 2 or 4 to 18 carbon atoms with melt indexes of 0.05 to 45 g/10 min at 230° C. 2.16 kg and ethylenically unsaturated, multifunctional monomers, the modified propylene homopolymers and/or modified propylene copolymers being produced by a continuous method, for which the particulate propylene homopolymers and/or particulate propylene copolymers, in the form of powder, granulate or grit with particle sizes ranging from 0.001 to 7 mm and preferably from 0.05 to 4 mm, optionally with the addition of 0.05 to 3% by weight, based on the propylene homopolymers and/or propylene copolymers used, of acyl peroxides, alkyl peroxides, hydroperoxides, peroxycarbonates and/or peresters as thermally decomposing free radical-forming agents, are reacted with a gas mixture, which consists of 5 to 65% by volume of readily volatile, ethylenically unsaturated, multifunctional monomers, preferably $C_4$ to $C_{10}$ dienes and/or $C_7$ to $C_{10}$ divinyl compounds, and 95 to 35% by volume of inert gas or oxygen or inert gas-oxygen mixtures in any mixing ratio, whereby a) the particulate propylene homopolymers and/or particulate propylene copolymers are treated in a continuous mixer, optionally with the addition of thermally decomposing free radical-forming agents, with the gas mixture at a temperature of 20° C. to 120° C. and preferably of 60° to 100° C. and an average residence time of 10 seconds to 1,000 seconds and preferably of 60 seconds to 600 seconds, in the solid phase, the proportion of the bifunctional, unsaturated monomers, absorbed in the particulate propylene homopolymers and/or particulate propylene copolymers, amounting to 0.01 to 10% by weight and preferably 0.05 to 2% by weight, based on the particulate propylene homopolymers and/or particulate propylene copolymers used, b) the particulate propylene homopolymers and/or particulate propylene copolymers, in which the readily volatile, multifunctional, ethylenically unsaturated monomers are absorbed are melted under an atmosphere of this gas mixture at 110° C. to 210° C. during a residence time of 0.3 to 8.0 minutes, c) the melt thereupon is heated to a temperature of 220° C. to 300° C. during a period of 0.3 to 7.0 minutes, unreacted, readily volatile, multifunctional, ethylenically unsaturated monomers and decomposition products being removed, and d) the melt is granulated in a known manner, and, before steps a) and/or step d) of the method and/or before or during step c) of the process, 0.01 to 2.5% by weight of stabilizers, 0.1 to 1% by weight of antistatic agents, 0.2 to 3% by weight of pigments, 0.05 to 1% by weight of nucleating agent, 5 to 40% by weight of filler and/or reinforcing agents, 2 to 20% by weight of flame retardants and/or 0.01 to 5% by weight of processing aids, based on the propylene homopolymer and/or propylene copolymer used, optionally being added as further additives.

Especially preferred are propylene homopolymers, random propylene copolymers, propylene block copolymers, random propylene block copolymers and elastomeric polypropylenes.

Particularly suitable for the production of polypropylenes with improved processability are polypropylenes with a bimodal distribution of molecular weights, which were synthesized in a reactor cascade using Ziegler-Natta catalysts or metallocene catalysts, with weight average molecular weights $M_w$ of 500,000 to 1,500,000 g/mole, number average molecular weights $M_n$ of 25,000 to 100,000 and $M_w/M_n$ values of 5 to 60 and preferably weight average molecular weights $M_w$ of 600,000 to 1,000,000 g/mole, number average molecular weights $M_n$ of 30,000 to 100,000 and $M_w/M_n$ values of 15 to 35.

Preferably, peroxides and gas mixtures of multifunctional, ethylenically unsaturated monomers and inert gases are used. It proved to be particularly advantageous to modify polyolefin particles coming directly from the polymerization plant.

The amount of thermally decomposing free radical-forming agents can be reduced, if gas mixtures of multifunctional, ethylenically unsaturated monomers and inert gas/oxygen mixtures or oxygen are used. Under these conditions, it is possible to do without the use of thermally decomposing free radical-forming agents.

Optionally, the following thermally decomposing free radical-forming agents are used for the production of modified polypropylenes of improved processability:

acyl peroxides, such as benzoyl peroxide, 4-chlorobenzoyl peroxide, 3-methoxybenzoyl peroxide and/or methyl benzoyl peroxide;

alkyl peroxides, such as allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylarminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide;

peresters and peroxy carbonates, such as butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitroperbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succinimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate;

or mixtures of these free radical-forming agents.

Suitable inert gas components of the gas mixture are nitrogen or argon.

As multifunctional, ethylenically unsaturated monomers in the gas mixture for the production of modified polypropylenes of improved processability, all bifunctional, unsaturated, monomeric compounds, which can be absorbed from the gas phase and polymerized with the help of free radicals, can be used. Preferably, the following, bifunctional, unsaturated monomers, in amounts of 0.01 to 10% by weight and preferably of 0.05 to 2% by weight, based on the amount of polypropylenes, are used:

divinyl compounds, such as divinylaniline, m-divinylbenzene, p-divinylbenzene, divinylpentane and/or divinylpropane;

allyl compounds, such as allyl acrylate, allyl methacrylate, allyl methyl maleate and/or allyl vinyl ether;

dienes, such as butadiene, chloroprene, cyclohexadiene, cyclopentadiene, 2,3dimethylbutadiene, heptadiene, hexadiene, isoprene and/or 1,4-pentadiene: mixtures of these unsaturated monomers.

The use of butadiene, isoprene and/or dimethyl butadiene as readily volatile, bifunctional monomer is especially preferred.

As stabilizers, preferably mixtures of 0.01% to 0.6% by weight of phenolic antioxidants, 0.01% to 0.6% by weight of 3-arylbenzofuranones, 0.01% to 0.6% by weight of processing stabilizers based on phosphides, 0.01% to 0.6% by weight of high temperature stabilizers based on disulfides and thioethers and/or 0.01% to 0.8% by weight of sterically hindered amines (HALS) are used.

Suitable phenolic antioxidants are 2-t-butyl-4,6-dimethylphenol, 2,6-di-t-butyl-4-methylphenol, 2,6-di-t-butyl-4-isoamylphenol, 2,6-di-t-butyl-4-ethylphenol, 2-t-butyl-4,6-diisopropylphenol, 2,6-dicyclopentyl-4-methylphenol, 2,6-di-t-butyl-4methoxymethylphenol, 2-t-butyl-4,6-dioctadecylphenol, 2,5-di-t-butylhydroquinone, 2,6-di-t-butyl-4,4-hexadecyloxyphenol, 2,2'-methylene-bis(6-t-butyl-4-methylphenol), 4,4'-thio-bis-(6-t-butyl-2-methylphenol), octadecyl 3(3,5-di-t-butyl-4-hydroxyphenyl)propionate, 1,3,5-trimethyl-2,4,6-tris(3'-5'-di-t-butyl-4-hydroxybenzyl)benzene and/or pentaerythritol-tetrakis(3-(3,5-di-t-butyl-4-hydroxyphenyl))propionate.

As benzofuranone derivative, 5,7-di-t-butyl-3-(3,4-di-methylphenyl)-3H-benzofuran-2-one, in particular, is suitable.

As HALS compounds, bis-2,2,6,6-tetramethyl-4-piperidyl sebacate and/or poly-((1,1,3,3,-tetramethylbutyl)-imino)-1,3,5-triazine-2,4,diyl)(2,2,6,6-tetra-methyl-piperidyl)-amino)-hexamethylene-4-(2,2,6,6-tetremethyl)piperidyl)imino) are particularly suitable.

As nucleating agents, a nucleating agents, such as talcum, or the sodium salt of methylene-bis-(2,4-di-t-butylphenol) phosphoric acid or β nucleating agents, such as adipic acid dianilide, debenzoquinacridone or N,N'-dicyclohexyl-2,6-naphthalene dicarboxamide are used.

As processing aids, calcium stearate, magnesium stearate and/or waxes can be used.

Pursuant to the invention, the modified polypropylene of improved processability are produced by a continuous method, in which the particulate propylene homopolymers and/or particulate propylene copolymers, in the form of a powder, granulate or grit with particle sizes ranging from 0.001 to 7 mm and preferably from 0.05 to 4 mm, optionally with the addition of 0.05 to 3% by weight, based on the propylene homopolymers and/or propylene copolymers used, of acyl peroxides, alkyl peroxides, hydroperoxides, peroxycarbonates and/or peresters as thermally decomposing free radical-forming agents, are reacted with a gas mixture, which consists of 5 to 65% by volume of readily volatile, multifunctional, ethylenically unsaturated monomers, preferably $C_4$ to $C_{10}$ dienes and/or $C_7$ to $C_{10}$ divinyl compounds, and 95 to 35% by volume of inert gas or oxygen or inert gas-oxygen mixtures in any mixing ratio, a) the particulate propylene homopolymers and/or particulate propylene copolymers being treated in a continuous mixer, optionally with addition of thermally decomposing free radical-forming agents, with the gas mixture at a temperature of 20° to 120° C. and preferably of 60° to 100° C. and an average residence time of 10 seconds to 1000 seconds and preferably of 60 to 600 seconds in the solid phase, the proportion of bifunctional, unsaturated monomers, absorbed in the particulate propylene homopolymers and/or particulate propylene copolymers being 0.01 to 10% by weight and preferably 0.05 to 2% by weight, based on the particulate propylene homopolymers and/or particulate propylene copolymers used, b) the particulate propylene homopolymers and/or particulate propylene copolymers, in which the readily volatile multifunctional ethylenically unsaturated monomers are absorbed, are melted under an atmosphere of this gas mixture in continuously operating kneaders or extruders, preferably in twin screw extruders at 110° to 210° C. and a residence time of 0.3 to 8.0 minutes, c) the melt thereupon is heated to 220° to 300° C. during a residence time of 0.3 to 7.0 minutes, unreacted, readily volatile, multifunctional, ethylenically unsaturated monomers and decomposition products being removed and d) the melt is granulated in a known manner, and whereby, before step a) and/or step d) of the process and/or before or during step c) of the process, 0.01 to 2.5% by weight of stabilizers, 0.1 to 1% by weight of antistatic agents, 0.2 to 3% by weight of pigments, 0.05 to 1% by weight of nucleating agents, 5 to 40% by weight of fillers or reinforcing materials, 2 to 20% by weight of flame retardants and/or 0.01 to 5% by weight of processing aids, based on the propylene homopolymers and/or propylene copolymer used, can optionally be added as further additives.

Pursuant to the invention, the temperature T, at which the absorption of the readily volatile, bifunctional monomer for the production of the modified polypropylenes of improved processability is carried out, is selected so that the decomposition of the optionally contained, thermally decomposing free radical-forming agent proceeds at a low rate.

The inventive method for producing the modified polypropylenes of improved processability is distinguished, above all, owing to the fact, that in steps b) and c) of the process, the bifunctional, unsaturated monomers are present in the gaseous state and are absorbed from the gas phase, so that a condensation at the surfaces of the polypropylene particles and between the particles is avoided. Pursuant to the invention, a temperature T is selected for the absorption, at which the half life of the optionally added thermally decomposing free radical-forming agent is a multiple of the time required for attaining a stationary equilibrium for the absorption for the bifunctional, unsaturated monomers, in order to exclude the decomposition of the thermally decomposing free radical-forming agent in step b) of the process. The temperature, at which the half life of the free radical-forming agent is 1 minute, should fall within the range of 155° to 150° C., so that the thermal decomposition of the free radical-forming agent commences at temperatures below 150° C., at which the reaction mixture is still present as a solid phase, and is ended almost completely at a temperature of 180° C. to 200° C., at which the reaction mixture is in the melting phase.

In step (c) of the process, free radicals are formed by the heating resulting from the decomposition of the free radicals, formed on the polymer chain and/or of the thermally decomposing free radical-forming agents, and lead to an abstraction of hydrogen from the polypropylene chain and, subsequently, to a coupling of the bifunctional unsaturated monomers with the polypropylene. Due to the largely homogeneous distribution of free radical-forming species and of bifunctional, unsaturated monomers in the polypropylene particles, on the one hand, a high efficiency of the modification and, on the other, a homogeneous distribution of the modified regions in the polypropylene particles is attained pursuant to the invention. In the final analysis, this homogeneous distribution has a decisive effect on the morphology developing in the product and, with that, brings about essentially the characteristic macroscopic values of the product, such as the strength and the impact strength.

As continuous gas-solid absorber for the method of producing the modified polypropylenes of improved processability, preferably continuous flow-through mixers are used for absorbing the readily volatile, bifunctional monomers.

The heating and melting of the polypropylene particles, in which the bifunctional, unsaturated monomers and, optionally, the acyl peroxides, alkyl peroxides, hydroperoxides and/or peresters are absorbed as thermally decomposing free radical-forming agents, takes place in the case of the inventive method for producing the modified polypropylenes of improved processability under an atmosphere of the readily volatile, bifunctional, unsaturated monomers, preferably in continuously operating kneaders or extruders, preferably in twin screw extruders.

The improved processability of the modified polypropylenes, produced by the inventive method, can be characterized by the threshold value $\xi$, which is defined as the ratio of extrudate diameter of the modified polypropylene $d_f$ (mm) to the extrudate diameter of the not modified polypropylene starting material $d_A$ (mm). The extrudate diameter is ascertained by determining the melt index of polypropylene by the ISO1131 method.

The processing behavior of the modified polypropylenes, produced by the inventive method, is more similar to the more advantageous processing behavior of the polyethylene, produced by the high-pressure method, if the threshold value $\xi$ of the modified polypropylene is higher. Modified polypropylene with threshold values $\xi$ of 1.1 to 3.0 can be produced by the inventive method.

The invention is explained, by way of example, by means of the process outline of FIG. 1. The reference numbers in this Figure have the following meanings:

1 intermediate storage bin for polypropylene
2 product transfer tube
3 metering device for solids
4 continuous, heatable flow-through mixer
5 metering pump
6 quantity control for monomer metering
7 gas pressure control
8 waste gas purification
9 twin screw extruder
   a special housing with connecting piece for supplying the gas
   b special housing with connecting piece for supplying the powdery reaction mixture
   c special housing with connecting piece for degassing
   d special housing with connecting piece for metering in entraining agent
   e special housing with connecting piece for final degassing
   f connecting piece for metering additional material granulating equipment The polypropylene passes from the intermediate storage bins (1) over a product transfer tube (2) and a solids metering device (3) to a continuous, heatable flow-through mixer (4), which has a high homogenizing effect during the mixing of the polypropylene particles with the optionally added thermally decomposing free radical-forming agents.

The optionally added, thermally decomposing free radical-forming agents are transported with the metering pump (5) to an apparatus for atomizing the liquid and sprayed onto the fluidized bed produced mechanically in the flow-through mixer (4), in which the bifunctional, unsaturated monomers in the gas phase are absorbed by the polypropylene particles.

The gas mixture, containing the bifunctional, unsaturated monomers, is metered over a quantity controller (6), the nominal value of which is fixed as a function of the mass pressure or the melt index, into a special housing (a) of the twin screw extruder (9) ahead of the inflow connecting piece (b) for the powdery reaction mixture and flows countercurrently to the powder through the connecting piece (b) for the powdery reaction mixture into the continuously heatable flow-through mixer (4). In the addition pipe of the flow-through mixer, the bifunctional, unsaturated monomers mix with inert gas or oxygen or inert gas/oxygen mixtures carried in with the powder. The gas mixture flows over a pressure control (7) to the waste gas purification system (8).

The gas mixture, containing the bifunctional, unsaturated monomers, can optionally be circulated by a compressor-circulating pump.

The twin screw extruder (9), which is fitted at the special housing (a) with a connecting piece for supplying gas, makes it possible to heat and melt the treated polypropylene, supplied over the connecting piece (b), between the connecting pieces (b) and (c) in the presence of the bifunctional, unsaturated monomers.

The connecting piece (c) serves for roughly degassing the modified polypropylene. The equipping of the twin screw extruder with a connecting piece for metering-in the entraining agent (d) and a second connecting piece (e) for degassing brings about the final degassing of the reaction mixture. Optionally, further auxiliary materials can be added over the connecting piece (f). Screw elements having a high homogenizing effect between the connecting piece (f) and the product outlet serve to mix the modified polypropylene homogeneously. The downstream granulating equipment (10) brings about the comminution of the melt extrudate.

The polypropylenes of improved processability, modified pursuant to the invention, as well as mixtures of these modified polypropylenes of improved processability with unmodified polypropylenes are suitable particularly for the production of films, sheets, fibers, yarns, textile fabrics, panels, coatings, pipes, hollow objects and foamed materials.

The inventive method is explained by the following examples.

EXAMPLE 1

A powdery polypropylene homopolymer, with a melt index of 0.2 g/10 min at 230° C./2.16 kg and an average particle size of 0.55 mm, is taken from the interim storage bin (1) and added over the product transfer tube (2) and the solids metering device (3) continuously to the continuously heatable flow-through mixer (4) of the experimental equipment of FIG. 1. Furthermore, over the flanged-on auxiliary material metering device, 0.1% by weight of calcium stearate and 0.5% by weight of bis(t-butylperoxy-)-2,5-dimethylhexane, in each cased based on the polypropylene homopolymer, are added continuously to the flow-through mixer (4). During the process of mixing homogeneously at 45° C., the propylene homopolymer, charged with the thermally decomposing free radical-forming agent and auxiliary material, is charged absorptively during a residence time of 6 minutes at 45° C. by the mixture of butadiene and nitrogen, flowing in from the extruder (9) over the connecting piece b), with 1.1% by weight of butadiene, based on the polypropylene homopolymer. After transfer to the twin-screw extruder (9) over (b), the powdery reaction mixture, in contact with the mixture of butadiene and nitrogen, supplied over the connecting piece (a), and with the addition of 0.1% by weight of tetrakis(methylene(3,5-di-t-butylhydroxyhydrocinnamate)methane and 0.1% by weight of tris(2,4-di-t-butylphenyl)phosphite, is melted at a mass temperature of 235° C. and, after a rough degassing with the addition of water as entraining agent, degassed finally, discharged and granulated.

The resulting modified polypropylene contains 1.0% by weight of bound butadiene, as determined by IR spectroscopy, and has a melt index of 0.85 g/10 min. at 230° C./2.16 kg and a threshold value $\xi$ of 1.82.

EXAMPLE 2

A powdery random polypropylene copolymer, with a melt index of 0.85 g/10 min at 230° C./2.16 kg and an average particle size of 0.85 mm, is taken from the interim storage bin (1) and added over the product transfer tube (2) and the solids metering device continuously to the continuously heatable flow-through mixer (4) of the experimental equipment of FIG. 1. Furthermore, over the flanged-on auxiliary material metering device, 0.05% by weight of hydrotalcit, 0.05% by weight of calcium stearate and 0.45% by weight of t-butyl peroxybenzoate, in each cased based on the polypropylene homopolymer, are added continuously to the flow-through mixer (4). During the process of mixing homogeneously at 70° C., the polypropylene copolymer, charged with the thermally decomposing free radical-forming agent and auxiliary material, is charged absorptively during a residence time of 4 minutes at 70° C. by the mixture of divinylbenzene and nitrogen, flowing in from the extruder (9) over the connecting piece b), with 0.35% by weight of divinylbenzene, based on the polypropylene copolymer. After transfer to the twin-screw extruder (9) over (b), the powdery reaction mixture, in contact with the mixture of divinylbenzene and nitrogen, supplied over the connecting piece (a), and with the addition of 0.1% by weight of tetrakis(methylene(3,5-di-t-butylhydroxyhydrocinnamate) methane and 0.1% by weight of tris(2,4-di-t-butylphenyl) phosphite, is melted at a mass temperature of 225° C. and, after a rough degassing with the addition of water as entraining agent, degassed finally, discharged and granulated.

The resulting modified polypropylene copolymer contains 0.32% by weight of bound divinylbenzene, as determined by IR spectroscopy, and has a melt index of 1.35 g/10 min. at 230° C./2.16 kg and a threshold value $\xi$ of 2.0.

EXAMPLE 3

A powdery polypropylene homopolymer, with a melt index of 0.2 g/10 min at 230° C./2.16 kg and an average particle size of 0.55 mm, is taken from the interim storage bin (1) and added over the product transfer tube (2) and the solids metering device (3) continuously to the continuously heatable flow-through mixer (4) of the experimental equipment of FIG. 1. Furthermore, over the flanged-on auxiliary material metering device, 0.1% by weight of calcium stearate and 0.2% by weight of t-butyl perbenzoate, in each cased based on the polypropylene homopolymer, are added continuously to the flow-through mixer (4). During the process of mixing homogeneously at 45° C., the polypropylene homopolymer, charged with the thermally decomposing free radical-forming agent and auxiliary material, is charged absorptively during a residence time of 6 minutes at 45° C. by the mixture of butadiene and oxygen, flowing in from the extruder (9) over the connecting piece b), with 0.5% by weight of butadiene, based on the polypropylene homopolymer. After transfer to the twin-screw extruder (9) over (b), the powdery reaction mixture, in contact with the mixture of butadiene and oxygen, supplied over the connecting piece (a), and with the addition of 0.1% by weight of tetrakis (methylene(3,5-di-t-butylhydroxyhydrocinnamate)methane and 0.1% by weight of tris(2,4-di-t-butylphenyl)phosphite, is melted at a mass temperature of 235° C. and, after a rough degassing with the addition of water as entraining agent, degassed finally, discharged and granulated.

The resulting modified polypropylene contains 0.4% by weight of butadiene, as determined by IR spectroscopy, and has a melt index of 2.0 g/10 min. at 230° C./2.16 kg and a threshold value $\xi$ of 1.85.

What is claimed is:

1. A continuous method for producing a modified propylene homopolymer of improved processability from a propylene homopolymer having a melt index of 0.05 to 35 g/10 min at 230° C./2.16 kg and an ethylenically unsaturated, multifunctional monomer, comprising treating the propylene homopolymer, in particulate form as powder, granulate or grit having particle sizes in the range of 0.001 to 7 mm, with a gas mixture which consists of 5 to 65% by volume of ethylenically unsaturated, multifunctional monomer, which is readily volatile, and 95 to 35% by volume of inert gas or oxygen or an inert gas-oxygen mixture in any mixing ratio, wherein a) the treatment is conducted in a continuous mixer, with the gas mixture at a temperature of 20° C. to 120° C. and an average residence time of 10 seconds to 1,000 seconds and the particulate propylene homopolymer is in the solid phase, whereby the readily volatile, ethylenically unsaturated monomer is absorbed into the particulate propylene homopolymer without condensation of the readily volatile, ethylenically unsaturated monomer at the surfaces of the particulate propylene homopolymer in a proportion of 0.05 to 2 % by weight, based on the weight of the particulate propylene homopolymer, without grafting thereonto, b) the particulate propylene homopolymer into which the readily volatile, multifunctional, ethylenically unsaturated monomer has been absorbed is melted under an atmosphere of said gas mixture at 110° C. to 210° C. during a residence time of 0.3 to 8.0 minutes whereby at least most of the multifunctional, ethylenically unsaturated monomer grafts onto the propylene homopolymer, c) the melt thereupon is heated to a temperature of 220° C. to 300° C. during a period of 0.3 to 7.0 minutes, unreacted, readily volatile, multifunctional, ethylenically unsaturated monomer and decomposition products being removed, and d) the melt is granulated.

2. The method of claim 1, wherein the particulate homopolymer has a bimodal distribution of molecular weights, having been synthesized in a reactor cascade using a Ziegler-Natta catalyst or metallocene catalyst and having a weight average molecular weight $M_w$ of 500,000 to 1,500,000 g/mole, number average molecular weight $M_n$ of 25,000 to 100,000 g/mole and ratio $M_w/M_n$ of 5 to 60.

3. The method of claim 1, wherein the particle sizes of the particulate propylene homopolymer are in the range of 0.05 to 4 mm.

4. The method of claim 1, wherein the treatment of the particulate propylene homopolymer with the gas mixture is with the addition of 0.05 to 3%, by weight, based on the weight of the propylene homopolymer, of an acyl peroxide, alkyl peroxide, hydroperoxide, peroxycarbonate or perester.

5. The method of claim 1, wherein the gas mixture is at a temperature of 60'to 100° C. and the residence time is 60 seconds to 600 seconds.

6. The method of claim 1, wherein the ethylenically unsaturated multifunctional monomer is selected from the group consisting of $C_4$ to $C_{10}$ dienes and $C_7$ to $C_{10}$ divinyl compounds.

7. The method of claim 6, wherein the $C_4$ to $C_{10}$ dienes are selected from the group consisting of butadiene, isoprene and dimethylbutadiene.

8. A continuous method for producing a modified propylene copolymer of improved processability from a propylene copolymer of 85.0 to 99.9% by weight of propylene and 0.1 to 15.0% by weight of an α-olefin having 2 or 4 to 18 carbon atoms, the propylene copolymer having a melt index of 0.05 to 45 g/10 min at 230° C./2.16 kg, and an ethylenically unsaturated, multifunctional monomer, comprising treating the propylene copolymer, in particulate form as powder, granulate or grit having particle sizes in the range of 0.001 to 7 mm, with a gas mixture which consists of 5 to 65% by volume of ethylenically unsaturated, multifunctional monomer, which is readily volatile, and 95 to 35 % by volume of inert gas or oxygen or an inert gas-oxygen mixture in any mixing ratio, wherein a) the treatment is conducted in a continuous mixer, with the gas mixture at a temperature of 20° C. to 120° C. and an average residence time of 10 seconds to 1,000 seconds and the particulate propylene copolymer is in the solid phase, whereby the relatively volatile, ethylenically unsaturated monomer is absorbed into the particulate propylene copolymer without condensation of the readily volatile, ethylenically unsaturated monomer at the surfaces of the particulate propylene copolymer in a proportion of 0.05 to 2% by weight, based on the weight of the particulate propylene copolymer, without grafting thereonto, b) the particulate propylene copolymer into which the readily volatile, multifunctional, ethylenically unsaturated monomer has been absorbed is melted under an atmosphere of said gas mixture at 110° C. to 210° C. during a residence time of 0.3 to 8.0 minutes whereby at least most of the multifunctional, ethylenically unsaturated monomer grafts onto the propylene copolymer, c) the melt thereupon is heated to a temperature of 220° C. to 300° C. during a period of 0.3 to 7.0 minutes, unreacted, readily volatile, multifunctional, ethylenically unsaturated monomer and decomposition products being removed, and d) the melt is granulated.

9. The method of claim 8, wherein the particulate propylene copolymer has a bimodal distribution of molecular weights, having been synthesized in a reactor cascade using a Ziegler-Natta catalyst or metallocene catalyst, and having a weight average molecular weight $M_w$ of 500,000 to 1,500,000 g/mole, number average molecular weight $M_n$ of 25,000 to 100,000 g/mole and ratio $M_w/M_n$ of 5 to 60.

10. The method of claim 8, wherein the particle sizes of the particulate propylene copolymer are in the range of 0.05 to 4 mm.

11. The method of claim 8, wherein the treatment of the particulate propylene copolymer with the gas mixture is with the addition of 0.05 to 3%, by weight, based on the weight of the propylene copolymer, of an acyl peroxide, alkyl peroxide, hydroperoxide, peroxycarbonate or perester.

12. The method of claim 8, wherein the gas mixture is at a temperature of 60° to 100° C. and the residence time is 60 seconds to 600 seconds.

13. The method of claim 8, wherein the ethylenically unsaturated multifunctional monomer is selected from the group consisting of $C_4$ to $C_{10}$ dienes and $C_7$ to $C_{10}$ divinyl compounds.

14. The method of claim 12, wherein the $C_4$ to $C_{10}$ dienes are selected from the group consisting of butadiene, isoprene and dimethylbutadiene.

\* \* \* \* \*